(12) United States Patent
Gordon

(10) Patent No.: US 6,421,654 B1
(45) Date of Patent: Jul. 16, 2002

(54) LEARNING METHOD GENERATING SMALL SIZE NEURONS FOR DATA CLASSIFICATION

(75) Inventor: Mirta Beatriz Gordon, Grenoble (FR)

(73) Assignees: Commissariat a l'Energie Atomique; Centre National de la Recherche Scientifique, both of Paris (FR)

( * ) Notice: Subject to any disclaimer, the term of this patent is extended or adjusted under 35 U.S.C. 154(b) by 0 days.

(21) Appl. No.: 09/101,464

(22) PCT Filed: Nov. 17, 1997

(86) PCT No.: PCT/FR97/02060

§ 371 (c)(1),
(2), (4) Date: Aug. 2, 1999

(87) PCT Pub. No.: WO98/22883

PCT Pub. Date: May 28, 1998

(30) Foreign Application Priority Data

Nov. 18, 1996 (FR) .............................. 96 14022

(51) Int. Cl.⁷ ................................ G06E 1/00
(52) U.S. Cl. ............... 706/16; 706/25; 706/26
(58) Field of Search ............... 706/16, 25, 26

(56) References Cited

FOREIGN PATENT DOCUMENTS

EP          0 602 717          6/1994

OTHER PUBLICATIONS

International Conference on Neural Networks/Word Congress on Computational Intelligence, Orlando, Jun. 27–29, 1994, vol. 1, Jun. 27, 1994, Institute of Electrical and Electronics Engineers, pp. 215–220, XP000510407 Zhank B–T: "An Incremental Leaning Algorithm that Optimizes Network Size and Sample Size in one Trial" p. 215, colonne de guache, linge 1–p. 217, colonne de droite, ligne 4.

IEEE Transactions on Neural Networks, vol. 6, No. 1, Jan. 1, 1995, pp. 273–277, XP000483025 Setiono R et al: "Use of a Quasi–Newton Construction Algorithm" p. 273, colonne de gauche, ligne 1–p. 274, colonne de droite, ligne 17.

Proceedings of the International Symposium on Circuits and Systems (ISCS), Chicago, May 3–6, 1993, vol. 4 of 4 May 3, 1993, Institute of Electrical and Electronics Engineers, pp. 2403–2406–, XP000379695 Xiangui Yu et al: "A New Algorithm for Training Multilayer Feedforward Neural Networks" p. 2403, colonne de gauche, ligne 1–p. 2405, colonne de droite, ligne 33.

International Conference on Neural Networks/World Congress on Computational Intelligence, Orlando, Jun. 27–29, 1994, vol. 1, Jun. 27, 1994, Institute of Electrical and Electronics Engineers, pp. 204–208, XP000510406 Fletcher J et al: "Constuctively Learning a Near Minimal Neural Network Architecture"* le document an entier*.

*Primary Examiner*—George B. Davis
(74) *Attorney, Agent, or Firm*—Burns, Doane, Swecker & Mathis LLP

(57) ABSTRACT

The invention relates to a learning process generating neural networks designed to sort data into two classes separated by a non-linear surface and built up as the needs of the task to be carried out are defined. This surface is either quadratic, or partly linear and partly quadratic. Applications include shape recognition and sorting of objects or data.

14 Claims, 5 Drawing Sheets

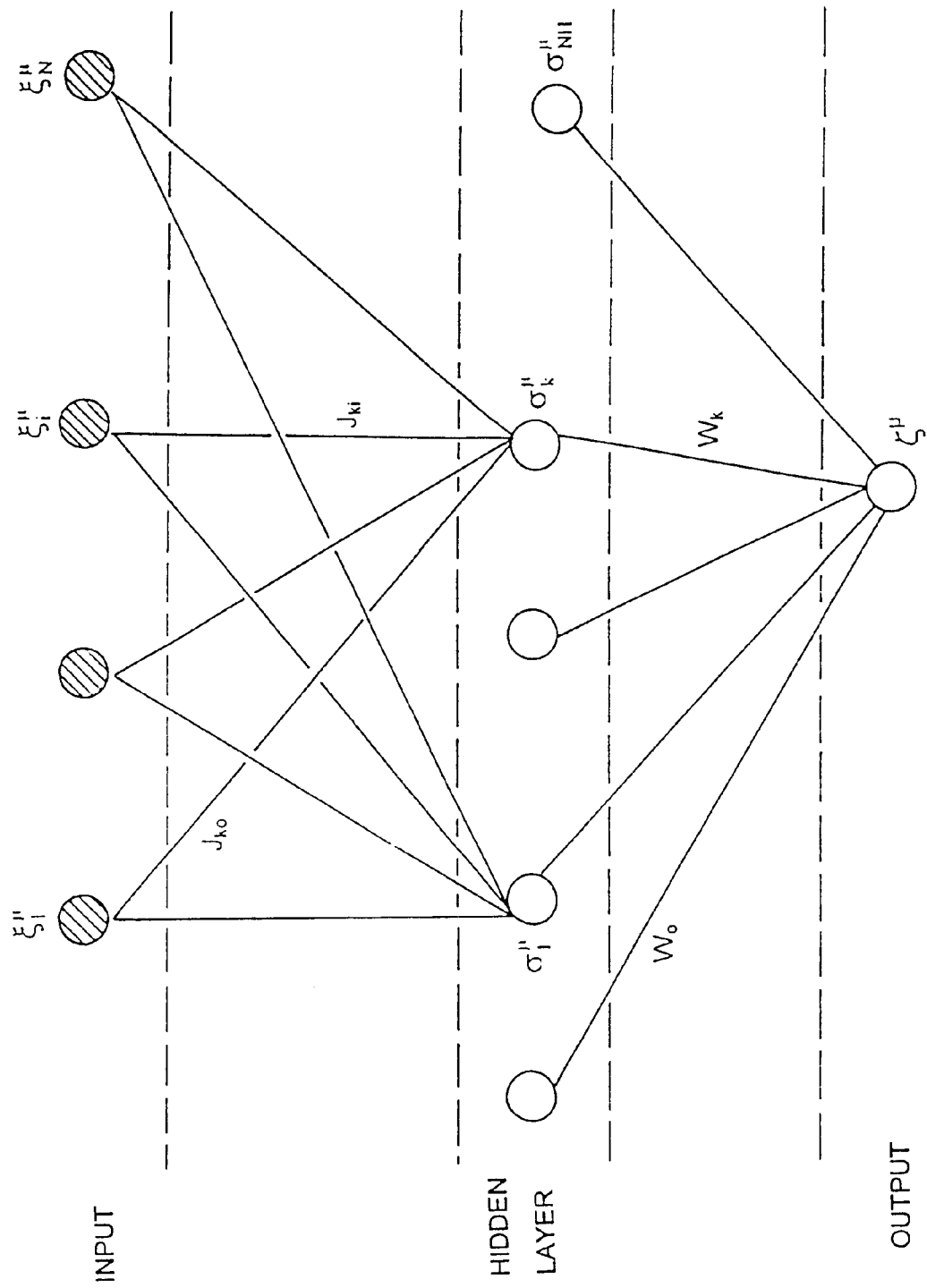

LEARNING METHOD GENERATING SMALL SIZE NEURONS FOR DATA CLASSIFICATION

TECHNICAL DOMAIN

This invention relates to a learning process generating neural networks designed for sorting data and built up as a function of the needs of the task to be carried out.

Applications of this invention are in domains making use of neural networks and particularly for medical diagnosis, recognition of shapes or sorting of objects or data such as spectra, signals, etc.

STATE OF THE ART

Neural networks, or neuron networks, are systems that carry out calculations on digital information, inspired from the behavior of physiological neurons. Therefore, a neural network must learn to carry out tasks that will be required of it subsequently. This is done using an examples base, or a learning base, that contains a series of known examples used to teach the neural network to carry out the tasks that it is to reproduce subsequently with unknown information.

A neural network is composed of a set of formal neurons. Each neuron is a calculation unit composed of at least one input and one output corresponding to a state. At each instant, the state of each neuron is communicated to the other neurons in the set. Neurons are connected to each other by connections, each of which has a synaptic weight.

The total neuron activation level is equal to the sum of the states of its input neurons, each weighted by the synaptic weight of the corresponding connection. At each instant, this activation level is used by the neuron to update its output.

In particular, the neural network may be a layered network; in this case, the network comprises one or several layers of neurons each connected to the previous layer, the last layer being the output layer. Each configuration of network inputs produces an internal representation that is used by subsequent layers, for example to sort the input state.

At the present time there are several learning algorithms used to sort data or for shape recognition starting from neural networks, as explained for example in the document entitled "Introduction to the theory of neural computation", by HERTZ, KROGH and PALMER (1991), Adison-Wesley.

Conventionally, the algorithms are used to fix network parameters, namely values of connection weights, the number of neurons used in the network, etc., using a number of known examples of data to be sorted. These examples make up the learning base.

The most frequently used algorithm is the gradient backpropagation algorithm. This type of algorithm is described for example in the document entitled "A learning scheme for asymmetric threshold networks"—in Cognitiva, Y. LE CUN, CESTA-AFCET Ed., pages 559–604 (1985). This algorithm consists of minimizing a cost function associated with the network output quality. However this algorithm needs neurons, the states of which are represented by real numbers, even for typically binary problems such as the problem of sorting into two classes. Gradient backpropagation also requires that the number of neurons to be used is input beforehand; however there is no theoretical criterion to guide the expert in the field in determining this number of necessary neurons.

Other algorithms, called "constructivist" or "adaptive" algorithms, adapt the number of neurons in the network as a function of the task to be carried out. Furthermore, some of these algorithms only use binary neurons, as described for example in the document entitled "Learning in feed forward layered neural networks: the tiling algorithm", MEZARD and NADAL, J. PHYS. A22, pages 2 191–2 203, and in the document entitled "Learning by activating neurons: a new approach to learning in neural networks", RUJAN and MARCHAND, complex Systems 3, (1989), page 229. The main disadvantage of these algorithms is that the learning rule at each neuron in the network is not efficient, such that the resulting networks are too large for the task to be solved and are not easily generalized.

The performance of an algorithm is measured by its generalization capacity, in other words its capacity to predict the class to which data that is not in the learning base belongs. In practice, it is measured using the "generalization error" which is the percentage of data in a test base (containing known examples and independent of the learning base) sorted incorrectly by the network for which the parameters were determined by the learning algorithm. One efficient learning algorithm for a neuron is described in the document entitled "Learning with temperature dependent algorithm" by GORDON and GREMPEL, Europhysics Letters, No. 29, pages 257 to 262, January 1995, and in the document entitled "Minimerror: perceptron learning rule that finds the optimal weights" by GORDON and BERCHIER, ESANN'93, Brussels, M. VERLEYEN Ed., pages 105–110. These documents describe an algorithm called the "Minimerror" that can learn sorting tasks by means of binary neurons. This algorithm has the advantage that its convergence is guaranteed and that it has good digital performances, in other words an optimum generalization capacity.

Furthermore, this Minimerror algorithm has been associated with another constructivist type learning rule called "Monoplane". This Monoplane algorithm is described in the article entitled "An evolutive architecture coupled with optimal perceptron learning for classification" by TORRES-MORENO, PERETTO and GORDON, in Esann'95, European symposium on artificial neural networks, Brussels, April 1995, pages 365 to 370. This Monoplane algorithm combines the Minimerror algorithm with a method of generating internal representations.

This Monoplane algorithm is of the incremental type, in other words it can be used to build a neural network with a hidden layer, by adding neurons as necessary.

Its performances are thus better than the performances of all the other algorithms, which means that for an identical examples base used by a series of different algorithms, the results achieved using this Monoplane algorithm are better, in other words they have a lower generalization error.

However, these Minimerror and Monoplane algorithms use neurons with a sigmoidal activation function capable only of carrying out linear separations. A network produced from this type of neuron can therefore only set up plane boundaries (composed of hyperplanes) between domains in different classes. Therefore, when the boundaries between classes are curved, these networks have a linear approximation per piece, which introduces a certain amount of inaccuracy and the need to input a large number of neurons.

However other types of algorithms are capable of paving the space with hyperspheres, each of which is represented by a neuron. For example, these algorithms are described in COOPER, REILLY & ELBAUM (1988), Neural networks systems, an introduction for managers, decision-makers and strategists, NESTOR Inc. Providence, R.I. 02906-USA, and usually end up with a very large number of neurons even when they include pruning operations. Therefore these algorithms use too many resources, in other words too many neurons and too much weight to carry out the task.

DESCRIPTION OF THE INVENTION

The purpose of the invention is to overcome the disadvantages of the techniques described above. It does this by proposing a learning process generating small neural networks built according to the needs of the task to be carried out and with excellent generalization. This learning process is intended for sorting of objects or data into two classes separated by separation surfaces which may be quadratic, or linear and quadratic.

More precisely, the invention relates to a process for learning from an examples base composed of known input data and targets corresponding to the class of each of these input data, to sort objects into two distinct classes separated by at least one quadratic type or quadratic and linear type separating surface, this process consisting of generating a network of binary type neurons, each comprising parameters describing the separating surface that they determine, this neural network comprising network inputs and a layer of hidden neurons connected to these inputs and to a network output neuron characterized in that it comprises:

A) An initialization step consisting of:
  Aa) choosing the type of the first neuron that is connected to inputs;
  Ab) learning from the examples base ($B_0$) by this first neuron, in order to determine the descriptive parameters for a first separating surface, for this neuron;
  Ac) determining the number of learning errors,
  Ad) if this number of errors is zero, learning is finished and the first neuron chosen in Aa) becomes the network output neuron;
  Ae) if this number is not zero, the parameters on the first neuron are fixed and the second neuron becomes the first neuron (i=1) in a layer of hidden neurons built by:
B) a step in which the hidden layer is built and the network output neuron is determined, consisting of:
  B1) adaptation of the layer of hidden neurons as a function of the sorting to be done, consisting of:
    B1a) determining new targets for the examples base $B_0$ as a function of learning errors by the last neuron i learned, the inputs in the examples base $B_o$ being used with new targets forming a new examples base $B_i$;
    B1b) incrementing the hidden neuron counter i by one unit, and connecting a new hidden neuron i of a chosen type on the network inputs, and learning to sort the new examples base ($Bi$);
    B1c) fixing the parameters of this new neuron i, the states of the hidden neurons corresponding to each input data in the examples base $B_0$ forming an internal representation of this input data;
  B2) validating the layer of hidden neurons and determining the network output neuron.

According to a first embodiment of the invention, internal representations of inputs in the examples base form an internal representations base $B_{RI}$(i) and step B2) consists of:
  B2a) introducing a linear type output neuron, connecting this output neuron to the hidden neurons, teaching this output neuron the sort of the internal representations base $B_{RI}$ (i) and determining the number of learning errors in the output neuron:
  B2b) if this number is zero, considering that the network is built up and includes a layer of i hidden neurons;
  B2c) if this number is not zero, considering that the output neuron learning errors are errors from the previous neuron in step B1a), eliminating this output neuron and restarting the processing from step B1a) until the number of errors in the output neuron is zero.

According to a second embodiment in which the network inputs are binary, the process comprises an intermediate step B3) carried out between steps B1) and B2) and consisting of:
  B3a) determining the number of neuron i learning errors;
  B3b) if this number is not zero, the processing is repeated starting from step B1) assuming that the errors for this neuron are errors from the previous neuron in creating the learning base $B_i$;
  B3c) if this number is zero, consider the layer of hidden neurons built in this way as being potentially acceptable and carry out step B2).

According to a third embodiment of the invention in which network inputs are binary, the internal representations of inputs in the examples base form an internal representations base $B_{RI}$(i) and step B2), when it is carried out after step B3c), consists of:
  B2d) introducing an output neuron called a pseudo-neuron, connecting this pseudo-neuron to all hidden neurons for which the parameters are fixed, calculating the output from this pseudo-neuron as being approximately the product of the states of the hidden neurons;
  B2e) determining if the pseudo-neuron correctly sorts all examples in the internal representations base $B_{RI}$(i);
  B2f) if it does, learning is considered to be finished and the created network comprises a layer of i hidden neurons;
  B2g) if not, considering that the output pseudo-neuron sorting errors are errors from the previous neuron in step B1a), eliminating this output pseudo-neuron and restarting the processing at step B1a) until the number of output pseudo-neuron errors is zero.

According to one advantageous embodiment, the first neuron chosen in step Aa) may be a linear type neuron, the other neurons being non-linear.

According to another advantageous embodiment, all hidden neurons are of the quadratic type.

BRIEF DESCRIPTION OF THE FIGURES

FIG. 1 schematically shows a neural network with a hidden layer;

DESCRIPTION OF EMBODIMENTS OF THE INVENTION

Figure 2A:
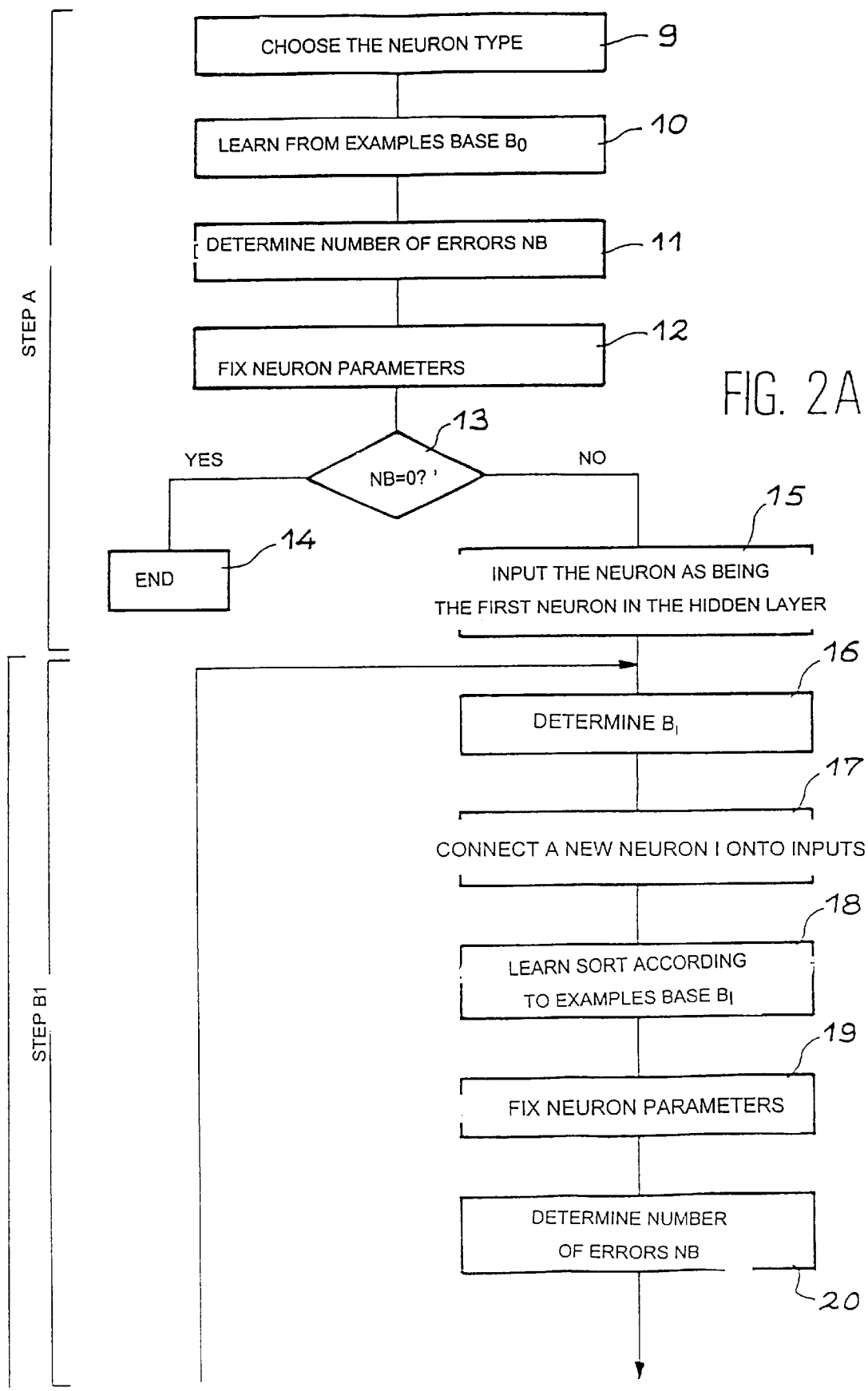
FIGS. 2A and 2B show the functional diagram of the process according to the invention with output neuron learning, in accordance with the first embodiment in step B2) of the invention.

The invention proposes a learning process for a neural network, by which it can learn to sort data into two classes separated by a non-linear surface using neural networks that are built up as necessary. This surface may be either quadratic, or partly linear and partly quadratic.

The neural network according to the invention is built up from generalized perceptrons, in other words basic neurons that are used to sort the data that they receive as input, into two classes.

More precisely, a perceptron is a neuron that receives N input signals, characterizing the object or data to be processed, and which calculates a function of these inputs, for example a weighted sum or a quadratic function or a logarithmic function, and gives the sign of the said function as the output signal.

The output from the perceptron will be 1 or −1, depending on whether representative vectors of input data (indifferently called "inputs" or "input data") are located on one side or the other side of a separation surface. This type of perceptron is called a "linear classifier" if the function of the inputs is the weighted sum of the inputs; in this case it can only sort data that can be separated by a hyperplane with normal w, in other words by a linear separating surface of order 1.

In general, a generalized perceptron is a neuron; a linear perceptron is a neuron that produces linear separation surfaces, a quadratic perceptron is a neuron that produces separation surfaces that are quadratic functions of network inputs. Neurons and perceptrons each represent a binary unit.

Therefore the process according to the invention consists of starting from a generalized perceptron and incrementally building a neural network, in other words by increasing the number of neurons necessary for the task to be carried out on this neural network.

More precisely, the process according to the invention consists of increasing the number of neurons in an intermediate layer, called a "hidden layer", in order to build up a network with a large enough number of neurons to carry out the task assigned to it, namely data sorting.

When the data set to be sorted can be separated linearly, a linear perceptron can be used. On the other hand, when the data set to be sorted cannot be separated linearly, neural networks with intermediate neuron layers called "hidden layers" located between the network output and the input units, can be used. However, note that a single neuron is sufficient if the separation can be done with a quadratic surface only.

However, the exact number of neurons necessary to build this hidden layer is initially unknown.

The process according to the invention can be used to build a network with at least one layer of hidden neurons, depending on requirements, in other words by increasing the number of neurons making up this hidden layer as a function of the data set to be sorted.

In this case, the number of neurons in the network increases during the learning process. The final architecture of the network and the network size are defined by the learning algorithm and depend on the set of examples used.

Therefore, each neuron added into the hidden layer is a generalized perceptron whose weight must be learned, the weights of all other neurons in the network already built remaining unchanged (in other words saved for future use).

The process according to the invention consists of building a neural network with at least one hidden layer connected to network input units and with a single output neuron connected to the neurons in the last hidden layer.

Throughout the rest of this description, we will consider the case of a network with a single hidden layer, knowing that the process to build several hidden layers repeats the process used to build a network with a single hidden layer, for each hidden layer.

Thus during learning, the number of neurons in the hidden layer increases until the network output neuron correctly sorts all or some of the learning set, in other words the examples in the learning base. The user determines the tolerable number of errors. At the end of the learning process, the weights of the neurons in the hidden layer are $J_K=(J_{ko}, \ldots, J_{ki} \ldots, J_{kn})$ where $0 \leq i \leq N$ and $1 \leq k \leq NH$, where NH is the number of neurons in the hidden layer and N is the number of network input units; and the weights of the network output are $W=(W_0, W_1, \ldots, W_k, \ldots, W_{NH})$, where $0 \leq k \leq NH$.

FIG. 1 shows an example of a network with a hidden layer.

This figure contains small circles representing the various neurons in the network. Solid circles represent network input units; they are denoted $\xi_i^\mu$, where $\mu$ is the number in the example; the neurons in the hidden layer are denoted $\sigma_k^\mu$ and their weights are vectors $J_k$; the output neuron is denoted $\xi^\mu$ with weights W. If an example $\xi^\mu=(\xi_1^\mu, \ldots \xi_1^\mu, \ldots \xi_N^\mu)$ is presented to the network input unit, the states $\sigma_k^\mu$ of the various neurons in the hidden layer and network output $\xi^\mu$ are given by the formulas:

$$\sigma_K^\mu = \text{sign } f_k^s(J_k, \xi^\mu), \text{ where } 1 \leq k \leq NH,$$

in which $f_k^s$ is the function that calculates the neuron k, and for example $f^s$ may be:

1) $f^1 = \sum_{i=0} J_{ki}\xi_i^\mu$     a weighted sum

2) $f^2 = \sum_{i=1}^{N} [(J_{ki} - \xi_i^\mu)^2 - J_{k0}^2]$     a quadratic function 3) $f^3 = \ln\left[\sum_{i=1}^{N} \frac{(J_{ki} - \xi_i^2)^2}{J_{k0}^2}\right]$     a logarithmic function and $\xi_\mu = \text{sign}\left(\sum_{k=0}^{NH} W_k \sigma_k^\mu\right)$ where $$\begin{cases} \sigma_0^\mu = +1 \\ \xi_0^\mu = +1 \end{cases}$$

for all examples and for all data to be sorted.

In other words, for examples $\xi^\mu$, the network will use a hidden layer composed of the neuron $\sigma_o^\mu$, and neurons $\sigma_i^\mu$ to $\sigma_{NH}^\mu$, the weights of which are $J_k$, where k is the number of the hidden neuron and which are connected to the output neuron $\xi^\mu$ for which the weights are W. Consequently the states $\sigma^\mu=(\sigma_o^\mu, \sigma_i^\mu, \ldots \sigma_{NH}^\mu)$ form the internal representation of examples $\xi^\mu$ used by neurons in the network hidden layer.

Therefore, the process according to the invention consists of defining an internal representation for each example and learning the separation of internal representations by the output neuron, and adding neurons in the single hidden layer if necessary.

In order to produce a hidden layer, the process according to the invention begins by getting the generalized perceptron to learn the required outputs. If the problem cannot be separated, then there will necessarily be learning errors. In this case, perceptron weights will be fixed and this perceptron will become the first neuron in the hidden layer. In one particular embodiment, a second hidden neuron will then be added which will learn a new sort of examples in order to correct the learning errors made by the previous neuron, for example output equal to −1 for examples learned correctly by the previous neuron, and +1 for the others.

The process may be repeated as long as there are any errors in the examples in the learning base.

Once the examples in the learning base have been learned, the output neuron is connected to the neuron in the hidden layer. The output neuron must learn to separate internal representations from the examples in the learning base.

If internal representations can be linearly separated, the process is terminated. Otherwise, the size of these internal representations will have to be increased in order to make them separable. For example, this can be done by adding a hidden neuron and enabling it to learn −1 sorts for examples sorted correctly by the output perceptron and +1 for the others.

If necessary, neurons could continue to be added into the hidden layer until the output neuron is capable of separating all examples in the learning base.

This results in building up a neural network with a single hidden layer.

Figure 2B:
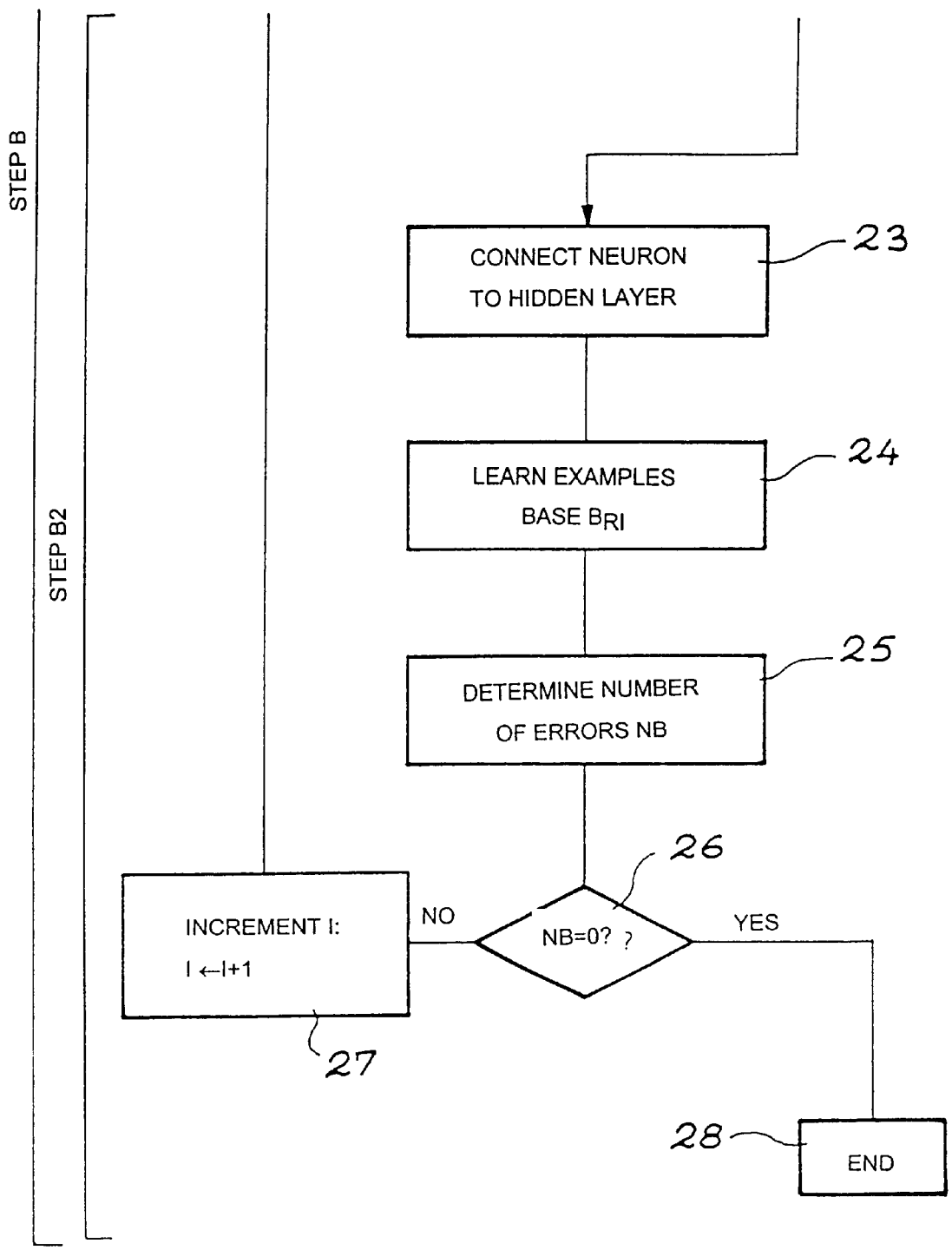

FIGS. 2A and 2B contain a functional diagram representing the process briefly described above. In particular, FIG. 2B represents the process according to the invention with a first output neuron learning mode.

The process according to the invention consists of two main steps, namely an initialization step A) and a learning step B), for learning of the neurons in the hidden layer and determination of the output neuron.

The initialization step A) starts by choosing the aneuron type (linear, quadratic, etc.), and then learning from the learning base $B_0$, in other words the inputs contained in this learning base $B_0$ with their associated targets in order to determine the descriptive parameters of the separating surface for this neuron.

The examples base $B_0$ is composed of input data (for example for a medical diagnosis, these data could be the temperature, the blood pressure, the tumor depth, the cell size, etc.) and targets, which are the class (for example tumor or no tumor, benign or malignant, etc.) corresponding to each input.

The internal representations that the i hidden neurons assign to the inputs of the examples base $B_0$, with the corresponding targets, make up the internal representations base $B_{Ri}(i)$, in other words the learning base of the output neuron connected to these i hidden neurons.

The state of all hidden neurons corresponding to each input in the base $B_0$ forms the internal representation of the said input data.

We will see later that the process according to the invention uses successive learning bases $B_i$; these learning bases $B_i$ contain the same examples as base $B_0$, but with different targets. Base $B_1$ is identical to base $B_0$, in other words the first neuron must learn to sort the base with the original targets.

This learning operation of the examples base $B_1$, reference 10, is carried out for the first neuron in the network.

When this learning has been done, an operation 11 is carried out to determine the number of learning errors Nb. Another operation 12 then consists of fixing parameters in the neuron on the separating surface for this neuron, in other words descriptive data about the surface type and weights $J_1$. A check on the number Nb is then made in step 13:

if the number of learning errors Nb is equal to zero, then it is considered that learning is finished (block 14);

if this number of errors is not equal to zero, then the neuron is input as the first hidden neuron (I=1) in a hidden neurons layer (operation 15).

A learning step B) is then carried out; this step consists of learning examples by the hidden neurons located in the hidden layer and by the output neuron.

In a first embodiment of the invention, step B) comprises a sub-step B1 which itself includes an operation 16 determining new targets, in which i is equal to i+1, which means that the targets to be learned by the next neuron are determined. More precisely, this operation 16 consists of determining new targets that define the examples base $B_i$, in which the examples depend on learning errors made by the previous neuron i−1.

The new targets (or hidden classes) are calculated by choosing a convention in which it is assigned a hidden class equal for example to +1, if the example was correctly learned by the previous neuron. If the example was not correctly learned by the previous neuron, it is assigned an opposite hidden class equal to −1. However, this convention is simply an example; the opposite convention could be chosen.

According to the invention, step B1) then includes an operation 17 during which a new neuron i, for which the type has been chosen, is connected to input units. This new neuron i then has to learn the learning base $B_i$ containing the same inputs as the learning base $B_0$, but containing targets corresponding to another sort, in other words the examples base $B_i$ defined in 16. This learning forms operation 18 in the process.

Then, when this learning has been done, the parameters for this new neuron are fixed in an operation 19. According to the preferred embodiment of the invention, the process then goes directly onto sub-step B2). According to one embodiment of the invention, the process comprises a sub-step B3) carried out between steps B1) and B2); the latter embodiment is shown in FIG. 3. This sub-step B3) comprises an operation 20 to determine the number of learning errors Nb. A verification of this value Nb is then made in 21.

if this number Nb is not zero, the process is reiterated after operation 15, in other words from the beginning of the hidden neuron learning step;

if this number Nb is zero, the process is continued at B2), an operation 23 is carried out that consists of connecting one neuron to all neurons in the hidden layer for which the parameters are fixed. It then consists of a learning operation 24 by this neuron, of the internal representations base $B_{Ri}$, built so as to determine the parameters of this neuron.

The process then consists of determining the number of learning errors Nb (operation 25). Step 26 includes a verification of this number Nb:

if Nb is zero, then learning of the output neuron is considered to be finished; the last neuron becomes the network output neuron, its parameters are fixed and the process stops (block 28);

if this number is not zero, the output neuron is eliminated in step 27 and the process is restarted from the beginning of operation 16 adding a new hidden neuron, considering the errors in the neuron that has just been eliminated as being learning errors in the previous neuron i−1.

Figure 3A:
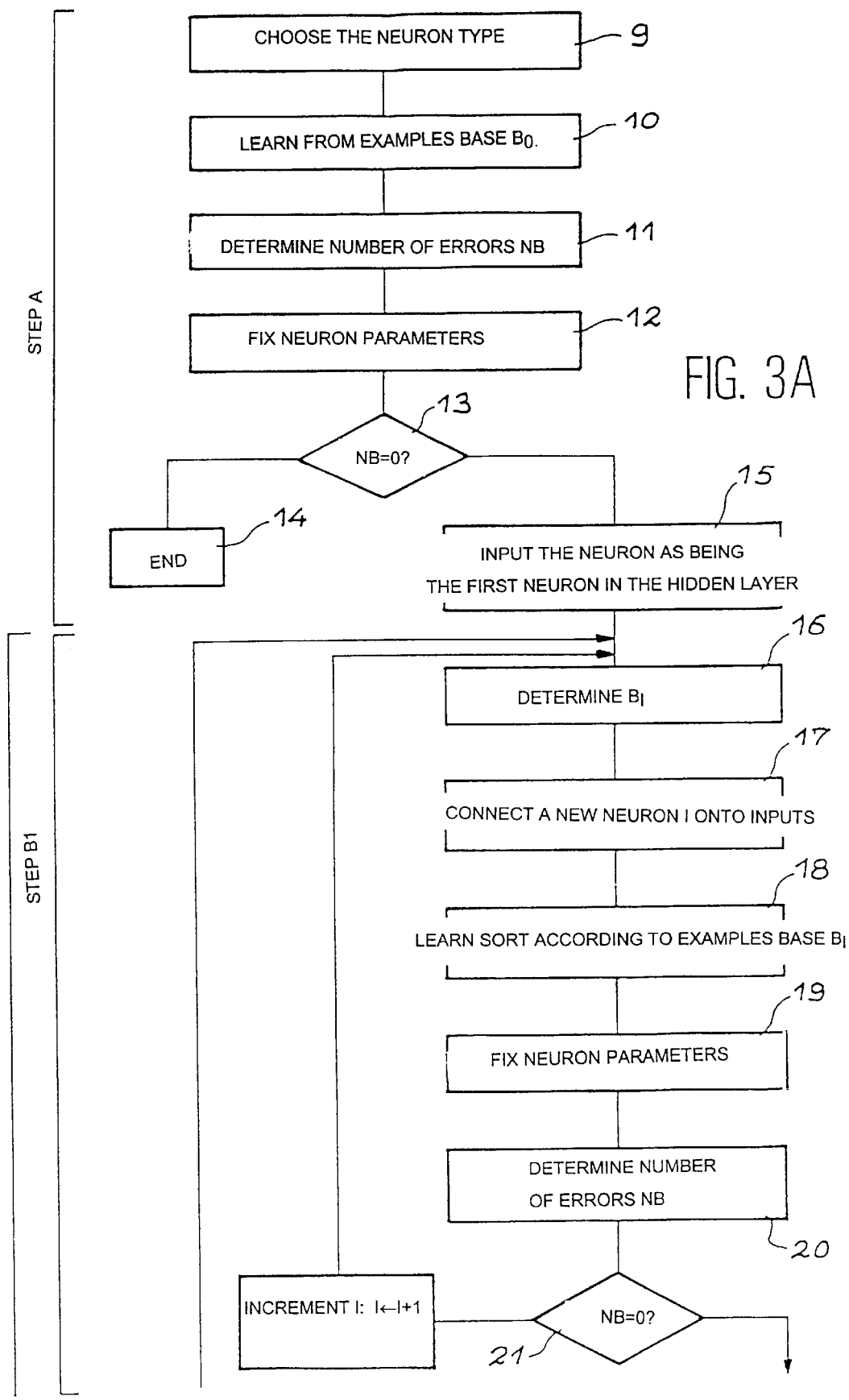
FIGS. 3A and 3B represent the functional diagram of the process according to the invention with output neurons learning according to the third embodiment of the invention.
Figure 3B:
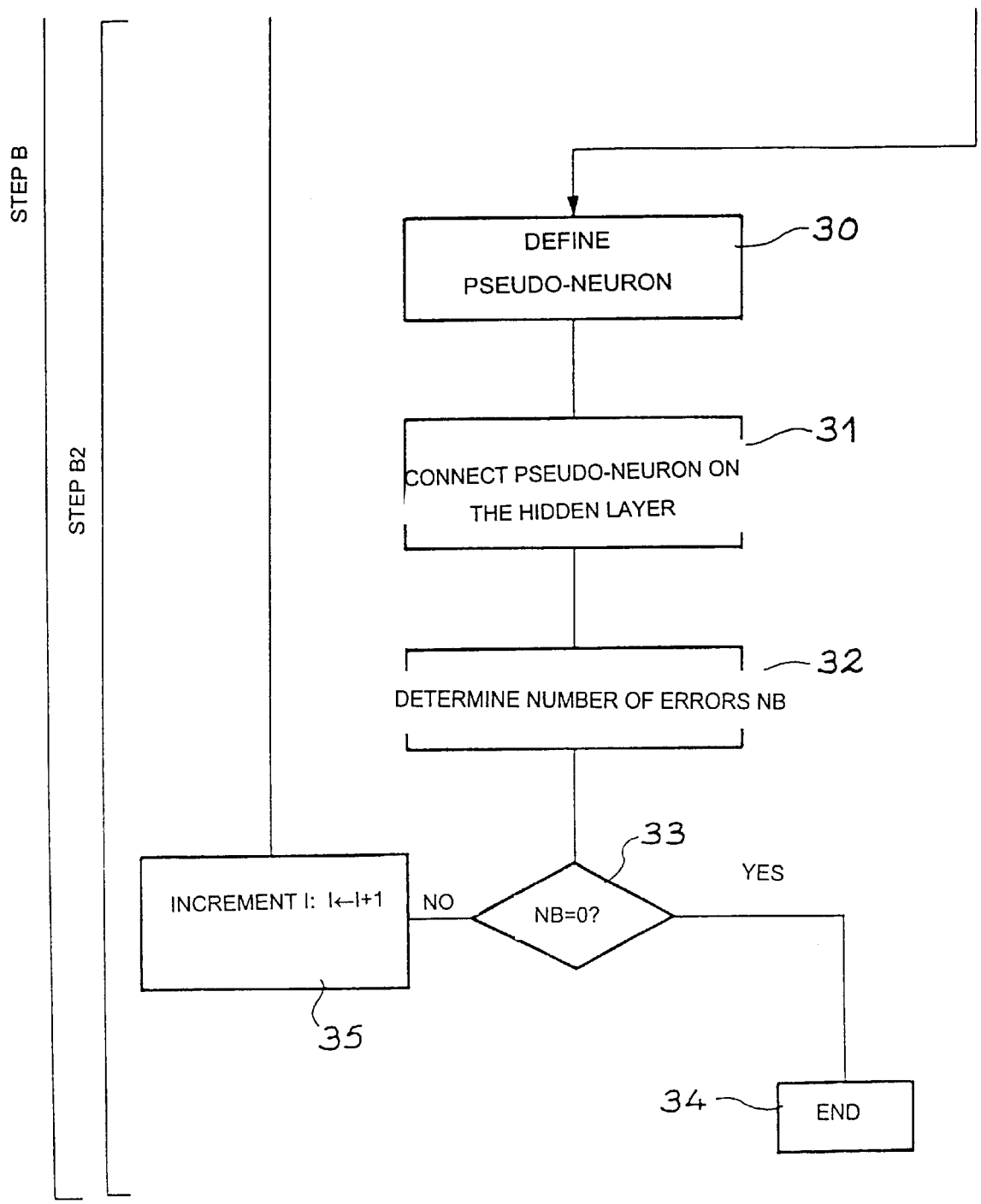

FIGS. 3A and 3B show the process according to the invention in which the output neuron learning step is carried out according to a third embodiment.

The initialization step A) and the output neuron learning step B) corresponding to operations 10 to 21 are not described again, since they are exactly the same as those described with reference to FIG. 2A.

The second embodiment comprises an operation 30 that consists of defining a pseudo-neuron and an operation 31 that consists of connecting this pseudo-neuron to all neurons in the hidden layer, for which the parameters are fixed. This pseudo-neuron then has an output that corresponds approximately to the product of the states of the hidden neurons.

The process continues with an operation 32 that consists of verifying if the sort of the internal representations base $B_{RI}$ by this pseudo-neuron is correct. This is done by verifying if the number Nb is zero (block 33). If it is, learning is finished (block 34). However if it is not, the pseudo-neuron is eliminated (block 35) and the process restarts from the beginning of operation 16 by adding a new hidden neuron, considering the errors in the pseudo-neuron that has just been eliminated as being learning errors in the previous neuron i−1.

Learning of each perceptron within the neural network, in other words all learning operations, from examples base $B_0$ or $B_i$ in the examples base $B_{RI}$ (operations 10, 18 and 23), may for example be carried out using a neuron learning process designed to sort data into two classes separated by a separating surface of order 1 or 2; this type of process is described in the patent application deposited as number 96 11939.

Note that for reasons of simplicity, it was considered throughout this description that the states of the binary neurons are all coded +1 or −1. However, the process according to the invention is applicable for different neuron states, for example coded 0 or 1, or coded using any other type of binary coding.

Furthermore, note that the output of the pseudo-neuron in the embodiment shown in FIG. 3B is the product of the states of the hidden neurons; however, this output is not necessarily the product of the states of the hidden neurons; for example, it could be replaced by logical parity functions, or by an exclusive OR.

As an expert in the subject will realize, the invention can be applied to more complex networks, including several layers of hidden neurons.

The expert in the subject will also understand that a neural network like the network described above can be used to sort objects into more than two classes; this would be done by associating the network with several other networks of the same type, each being used to separate one class from all others. For example, to choose the class assigned to the object to be sorted, it would be possible to take the class with the largest weighted sum on the corresponding network output neuron as a selection criterion.

What is claimed is:

1. Process for learning from an examples base composed of known input data and targets corresponding to the class of each of these input data, to sort objects into two distinct classes separated by at least one quadratic type or quadratic and linear type separating surface, this process consisting of generating a network of binary type neurons, each comprising parameters describing the separating surface that they determine, this neural network comprising network inputs and a layer of hidden neurons connected to these inputs and to a network output neuron characterized in that it comprises:

A) An initialization step consisting of:
   Aa) making a choice of a type of a first neuron that is connected to inputs;
   Ab) learning from an examples base by this first neuron, in order to determine the descriptive parameters for a first separating surface, for this neuron;
   Ac) determining a number of learning errors,
   Ad) if this number of errors is zero, learning is finished and the first neuron chosen in Aa) becomes the network output neuron; and
   Ae) if this number is not zero, the parameters on the first neuron are fixed and a second neuron becomes the first neuron in a layer of hidden neurons built by:

B) a step in which the hidden layer is built and the network output neuron is determined, consisting of:
   B1) adaptation of the layer of hidden neurons as a function of sorting to be done, consisting of:
      B1a) determining new targets for the examples base as a function of learning errors by a last neuron learned, the inputs in the examples base being used with new targets forming a new examples base;
      B1b) incrementing a hidden neuron counter by one unit, and connecting a new hidden neuron of a chosen type on the network inputs, and learning to sort the new examples base;
      B1c) fixing the parameters of this new neuron, states of the hidden neurons corresponding to each input data in the examples base forming an internal representation of this input data; and
   B2) validating the layer of hidden neurons and determining the network output neuron; and C) Using the network to sort objects.

2. Process according to claim 1, characterized in that internal representations of inputs in the examples base form an internal representations base and in that step B2) consists of:
   B2a) introducing a linear type output neuron, connecting this output neuron to the hidden neurons, teaching this output neuron the sort of the internal representations base and determining the number of learning errors in the output neuron:
   B2b) if this number is zero, considering that the network is built up and includes a layer of hidden neurons; and
   B2c) if this number is not zero, considering that the output neuron learning errors are errors from the previous neuron in step B1a, eliminating this output neuron and restarting the processing from step B1a) until the number of errors in the output neuron is zero.

3. Process according to claim 2, characterized in that the first neuron chosen in step Aa) is a linear type neuron, the other neurons being non-linear.

4. Process according to claim 2, characterized in that all hidden neurons are of the quadratic type.

5. Process according to claim 1, in which the network inputs are binary, the process comprises an intermediate step B3) carried out between steps B1) and B2) and consisting of:
   B3a) determining the number of neuron i learning errors;
   B3b) if this number is not zero, the processing is repeated starting from step B1) assuming that the errors for this neuron are errors from the previous neuron in creating the learning base; and
   B3c) if this number is zero, consider the layer of hidden neurons built in this way as being potentially acceptable and carry out step B2).

6. Process according to claim 5, characterized in that the internal representations of inputs in the examples base form an internal representations base and in that step B2) consists of:
   B2d) introducing an output neuron called a pseudo-neuron, connecting this pseudo-neuron to all hidden neurons for which the parameters are fixed, calculating the output from this pseudo-neuron as being approximately the product of the states of the hidden neuron;

B2e) determining if the pseudo-neuron correctly sorts all examples in the internal representations base;

B2f) if it does, learning is considered to be finished and the created network comprises a layer of hidden neurons; and B2g) if not, considering that the output pseudo-neuron sorting errors are errors from the previous neuron in step B1a), eliminating this output pseudo-neuron and restarting the processing at step B1a) until the number of output pseudo-neuron errors is zero.

7. Process according to claim 6, characterized in that the first neuron chosen in step Aa) is a linear type neuron, the other neurons being non-linear.

8. Process according to claim 6, characterized in that all hidden neurons are of the quadratic type.

9. Process according to claim 5, characterized in that the first neuron chosen in step Aa) is a linear type neuron, the other neurons being non-linear.

10. Process according to claim 5, characterized in that all hidden neurons are of the quadratic type.

11. Process according to claim 1, characterized in that the first neuron chosen in step Aa) is a linear type neuron, the other neurons being non-linear.

12. Process according to claim 1, characterized in that all hidden neurons are of the quadratic type.

13. Process according to claim 1, characterized in that the sorted objects are medical images.

14. Process according to claim 1, characterized in that the sorted objects are shapes in an image.

* * * * *